H. J. AND F. R. EBERHARDT.
WORK ARBOR SUPPORT.
APPLICATION FILED JULY 1, 1919.

1,357,696.

Patented Nov. 2, 1920.
3 SHEETS—SHEET 3.

INVENTOR
Henry J. Eberhardt.
Fred Ross Eberhardt.
BY
ATTORNEY

UNITED STATES PATENT OFFICE.

HENRY J. EBERHARDT AND FRED ROSS EBERHARDT, OF NEWARK, NEW JERSEY, ASSIGNORS TO NEWARK GEAR CUTTING MACHINE CO., OF NEWARK, NEW JERSEY, A CORPORATION OF NEW JERSEY.

WORK-ARBOR SUPPORT.

1,357,696.  Specification of Letters Patent.  Patented Nov. 2, 1920.

Application filed July 1, 1919. Serial No. 307,889.

*To all whom it may concern:*

Be it known that we, HENRY J. EBERHARDT and FRED ROSS EBERHARDT, citizens of the United States, and residents of Newark, in the county of Essex and State of New Jersey, have invented certain new and useful Improvements in Work-Arbor Supports, of which the following is a specification.

The invention relates to cutting machines, and more particularly to machines in which the cutter or work arbor is provided with an end support bearing, for example, as in milling and gear cutting machines. In machines of this character, particularly when operating on large quantities of work of the same size, it is of importance to minimize the number of movements required of the operator in the mounting of the cutter or work.

It is the object of the present invention to provide means whereby the arbor support may be moved and swung out of the way, thus enabling the cutters or blanks to be more readily placed and removed and in manner to effect a considerable saving in time over methods heretofore in use. The invention is especially applicable to apparatus wherein the column or supporting member is made of a ribbed construction or box type, which construction very satisfactorily resists cutting strains under heavy work; and the invention, as embodied in a machine of this character, is shown in the accompanying drawings, in which—

Similar characters of reference designate corresponding parts throughout the several views.

Figure 1:
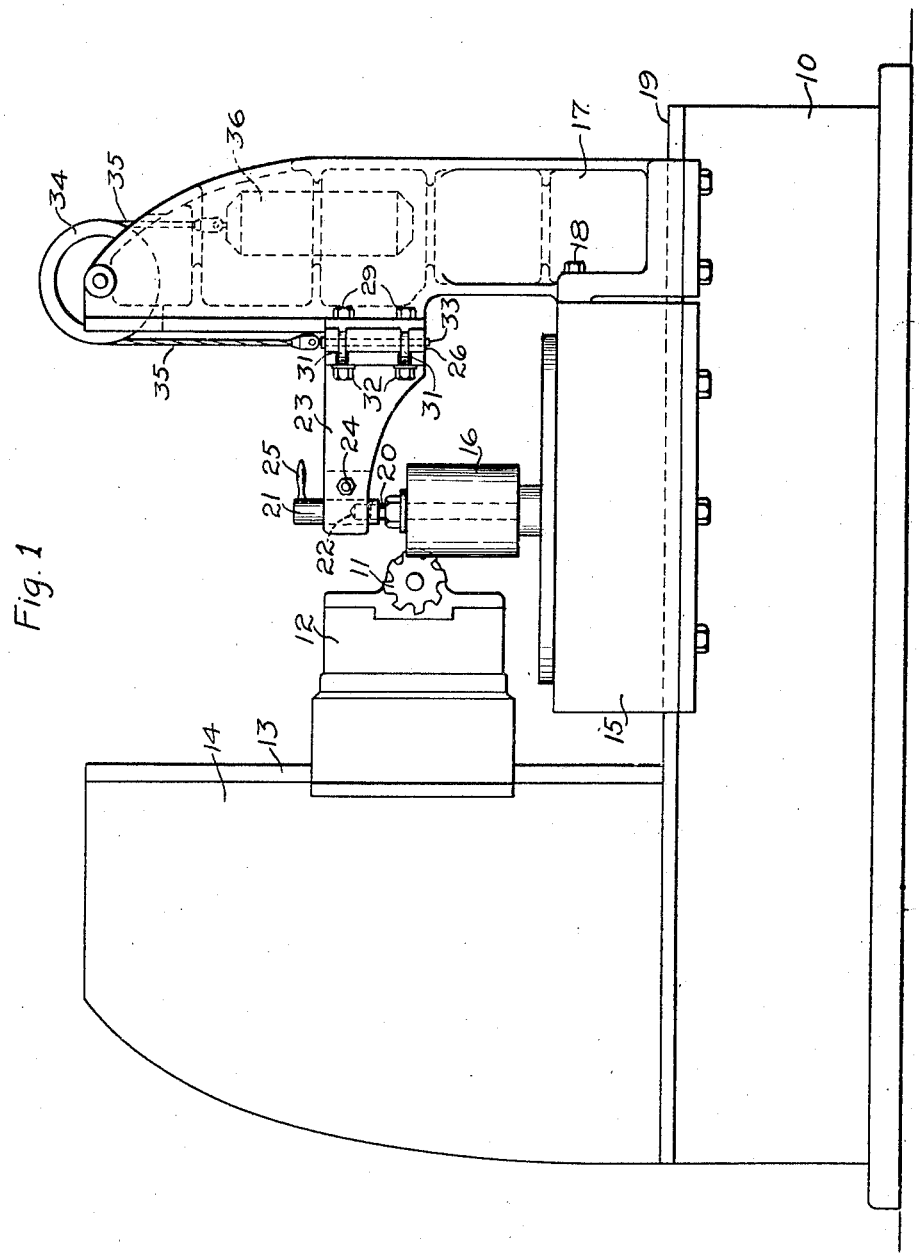
Figure 1 is a side elevation of a machine.
Figure 2:
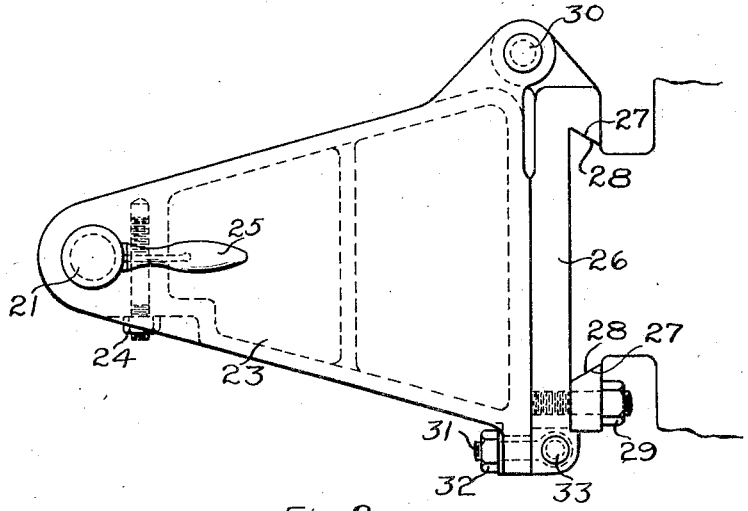
Figs. 2 and 3 are fragmentary views, respectively in plan and side elevation, of a support member, slide member, bearing member and spindle.
Figure 3:
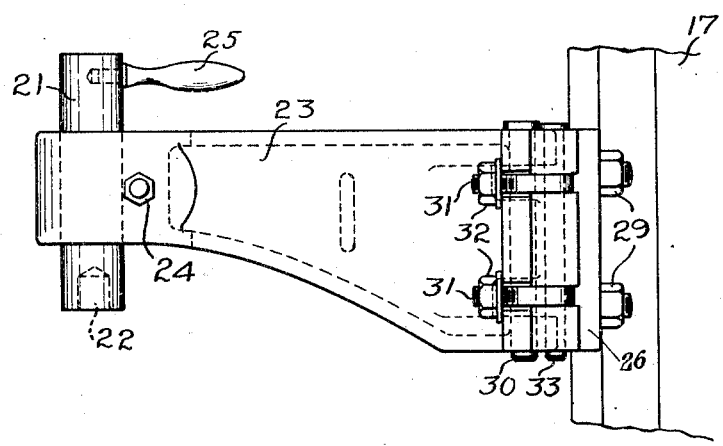

Referring to the drawings, 10 designates the frame or bed of the machine, herein shown, by way of example, as a vertical gear cutting machine, having a cutter 11 mounted in a carriage 12 which is slidable vertically upon ways 13 of a stanchion 14. The latter is secured to the said frame or bed 10, upon which is also adjustably mounted a work housing 15 for the work or gear blank 16 to be operated on by the cutter 11, the housing being further secured to a column 17, as by screws 18, to be movable horizontally therewith on ways 19 of the frame 10.

The usual arbor 20 is arranged to fit within the work 16 and is arranged to be secured at its arbor end by a spindle member 21 having a suitable socket 22 to receive the end of the arbor. Spindle 21 is adjustably secured at the inner end of an arm or bearing member 23 to slide therein, and is arranged to be locked thereto as, for example, by means of a clamping nut 24. A handle 25 may be provided at the outer end of the spindle to facilitate the adjustment of same. Vertical clearance from arbor 20 may, in many instances, thus be obtained by merely adjusting vertically the said spindle 21, to enable the bearing member or arm 23 to be swung outwardly for removal of the work or arbor.

Figure 6:
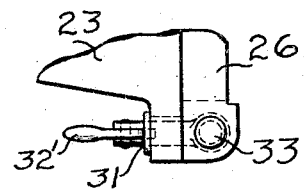
Figs. 6 and 7 show hinge member locking means employing a cam handle arrangement.
Figure 7:
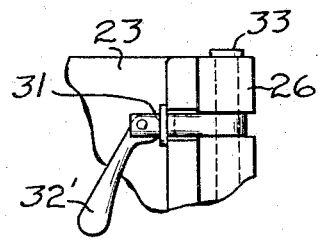
Figure 8:
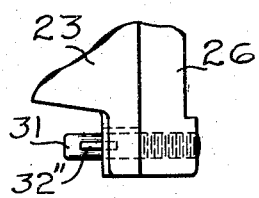
Figs. 8 and 9 show hinge member locking means employing a taper wedge arrangement.
Figure 9:
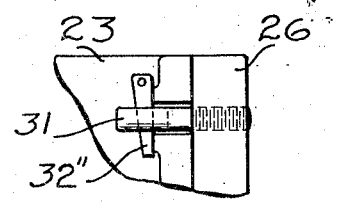

The latter movement is accomplished, with reference to the column 17, by hingedly connecting or swivelling the said arm, in manner hereinafter described, to a slide 26 movable vertically through ways 27 complementary to ways 28 of the column and to which it may be secured as through clamping nuts 29. Any convenient manner of hingedly securing arm 23 to the slide 26 may be employed, for example, as by means of a hinge pin or pintle 30; and the two members may be locked together by means of corresponding swinging bolts 31 and nuts 32, the said bolts being preferably secured to the slide by means of a pin 33 which passes through the eyes of both bolts. Of course, other well-known expedients, such as cam handles or wedges as shown in Figs. 6, 7, 8 and 9, may be substituted for the particular locking means shown, so long as the same may be quickly and conveniently operated to either lock or loosen the arm 23 with reference to the slide 26. As shown in Figs. 6 and 7, the arm 23 is secured to slide 26 by means of a cam lever 32′ bearing against the swinging bolt 31. In Figs. 8 and 9 the arm 23 is shown secured to slide 26 by means of a wedge 32″ bearing against the bolt 31.

It is preferred, also, to counterweight the slide and arm as, for example, by providing a sheave or pulley wheel 34, rotatably mounted at the upper end of the column 17, over which is designed to pass a cable 35 attached at one end to the said slide, and having secured to its other end a suitable counterweight 36 movable within the column 17.

To set the apparatus in operating position, the slide 26 carrying arm 23 is released through the bolts 29 and placed in a vertical position slightly above the top of the arbor 20. The spindle 21 is also placed so that its lower end is about flush with the lower face of the arm 23. Thereupon, the nuts 32 are loosened to permit arm 23 to be swung outwardly in a plane at right angles to the complementary guideways 27 and 28 of the column 17 to an inoperative position and sufficiently to allow for insertion of arbor and blank. Thereupon, the arbor, or arbor and blank, is lowered into place and secured in the work housing 15 and arm 23 returned to position over the arbor, the slide 26 remaining locked through the nuts 29. The spindle 21 is then lowered so that its socket 22 registers with the arbor 20, clamping nut 24 being tightened to rigidly clamp the spindle to the arm. To again remove the arbor, the above operations are reversed, nut 24 being loosened and spindle 21 raised through the handle 25. Thereupon, the nuts 32 are loosened and the arm swung out of the way, as hereinbefore set forth, without disturbing the vertical adjustment of the slide 26.

Figure 4:
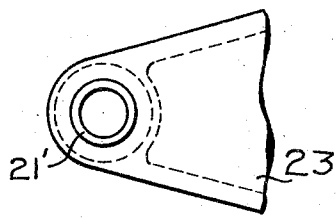
Figs. 4 and 5 are fragmentary views, respectively in plan and side elevation of a support member arranged without the use of a sliding spindle.
Figure 5:
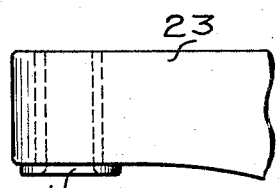

Spindle 21 may be removed entirely and discarded, and the remaining mechanism still embody the spirit of the invention, for example as shown in Figs. 4 and 5, the arm 23 may be provided with a cylindrical bushing 21′, in place of the spindle 21, to support the arbor. The benefits of time saving, by moving the bearing a short vertical distance before loosening nuts 32 and then swinging the arm 23 out of the way, are still retained. In this case, the vertical clearance from arbor 20 is obtained through the movement of the slide 26 on guide ways 27 as distinguished from the former case where the vertical clearance was obtained solely through the vertical movement of the spindle 21.

We claim:

1. In combination: a supporting member provided with guide ways, a member adjustably arranged to move upon the guide ways of said supporting member, a bearing member hingedly connected thereto, a spindle mounted in said bearing member, and adjustable means to secure said spindle in position.

2. In combination: a box type supporting member provided with guide ways, a slide member adjustably arranged to move upon the guide ways of said supporting member, a bearing member hingedly connected to said slide to swivel at right angles to said guide ways to an inoperative position, a spindle mounted in said bearing member, and adjustable means to secure said spindle in an inoperative position.

3. In combination: a supporting member provided with guide ways, a slide member adjustably arranged to move upon the guide ways of said supporting member, means to clamp said slide to said guide ways, a bearing member hingedly connected to said slide, clamping means to secure the bearing member to the slide, a spindle mounted in said bearing member, and means to clamp said spindle to said bearing member.

4. In combination: a supporting member provided with guide ways, a member adjustably arranged to move upon the guide ways of said supporting member, a bearing member hingedly connected thereto, a spindle mounted in said bearing member, adjustable means to secure said spindle in position, a sheave mounted on said supporting member, a counterweight movable in said supporting member, and means passing over said sheave and connecting said counterweight to said slide.

5. In a gear cutting machine: a frame, a work arbor, a suitable housing mounted on said frame for supporting the work and work arbor, a box type supporting member movable with said housing and provided with guide ways, a slide member adjustably arranged to move on the guide ways of said supporting member, a bearing member swiveled to said slide member and movable over said arbor, means to clamp said slide to the supporting member, means to clamp the bearing member to the slide, a spindle adjustably mounted at the free end of said bearing member and having a socket to receive the free end of the arbor, a sheave mounted on said supporting member, counterweighting means movable in said supporting member, and a cable secured to said counterweighting member passing over said sheave and connected also to said slide.

Signed at Newark, in the county of Essex and State of New Jersey, this 27th day of June, A. D. 1919.

HENRY J. EBERHARDT.
FRED ROSS EBERHARDT.